(12) United States Patent
Im et al.

(10) Patent No.: US 10,157,106 B1
(45) Date of Patent: Dec. 18, 2018

(54) METHOD CONTROLLING BACKUP DATA BY USING SNAPSHOT TYPE IMAGE TABLE

(71) Applicants: BitzKorea, Inc., Seoul (KR); Igloo systems INC., Namyangju-si (KR)

(72) Inventors: Dal Hyuk Im, Seoul (KR); Jong Wook Jung, Seoul (KR); Seoung Il Choi, Namyangju-si (KR)

(73) Assignees: BITZKOREA, INC., Seoul (KR); IGLOO SYSTEMS INC., Namyangju-si (KR)

( * ) Notice: Subject to any disclaimer, the term of this patent is extended or adjusted under 35 U.S.C. 154(b) by 0 days.

(21) Appl. No.: 15/962,100

(22) Filed: Apr. 25, 2018

(30) Foreign Application Priority Data

Jun. 20, 2017 (KR) .................. 10-2017-0077674

(51) Int. Cl.
*G06F 3/06* (2006.01)
*G06F 11/14* (2006.01)

(52) U.S. Cl.
CPC .......... *G06F 11/1451* (2013.01); *G06F 3/065* (2013.01); *G06F 3/0619* (2013.01); *G06F 11/1469* (2013.01); *G06F 2201/84* (2013.01)

(58) Field of Classification Search
CPC .... G06F 3/065; G06F 3/0619; G06F 2201/84; G06F 11/1451; G06F 11/1469
USPC ........................................................ 711/162
See application file for complete search history.

(56) References Cited

U.S. PATENT DOCUMENTS

| 8,538,924 | B2 |   | 9/2013 | Saika |             |
|-----------|----|---|--------|-------|-------------|
| 9,747,317 | B2 | * | 8/2017 | Bachar | G06F 17/30324 |
| 9,881,056 | B2 | * | 1/2018 | Machida | G06F 17/30507 |

FOREIGN PATENT DOCUMENTS

| JP | 2005-208950 | 8/2005 |
|----|-------------|--------|
| JP | 2010-191647 | 9/2010 |

\* cited by examiner

*Primary Examiner* — Hua J Song
(74) *Attorney, Agent, or Firm* — Lex IP Meister, PLLC

(57) ABSTRACT

Disclosed is a method of controlling backup data by using a snapshot type image table, the method including: assigning a snapshot table area; storing as first snapshot information a data size, a position address, and a time of data of the hard disk in the snapshot table area; storing as second snapshot information a data size designated from a data size of the first snapshot information, a position address, and a time of the added or removed data; respectively displaying and recording unique names, and data sizes and storage times, and displaying in a searchable list; and removing a connection to removed data, and maintaining a connection to added data. Accordingly, the method recovers and protects unexpected damaged data by assigning a snapshot table area with a minimum, and structurizing and recording in advance an address and a property of stored data.

1 Claim, 4 Drawing Sheets

METHOD CONTROLLING BACKUP DATA BY USING SNAPSHOT TYPE IMAGE TABLE

CROSS REFERENCE TO RELATED APPLICATION

The present application claims priority to Korean Patent Application No. 10-2017-0077674, filed Jun. 20, 2017, the entire contents of which is incorporated herein for all purposes by this reference.

BACKGROUND OF THE INVENTION

Field of the Invention

The present invention relates generally to a method of controlling backup data by using a snapshot type image table. More particularly, the present invention relates to a method of controlling backup data by using a snapshot type image table, the method being capable of performing a backup process by using a snapshot with a minimum space for protecting and recovering data stored in a hard disk of a computer system.

Description of the Related Art

Generally, during use of a computer system, data stored in a hard disk are frequently damaged or lost due to attacks by various virus programs, carelessness of a user, or a malicious behavior of the user. In addition, due to an installation or removing of a specific program, an operation of the computer system may malfunction.

Various prior methods have been developed to protect data stored in a hard disk against the problems occurring in such a computer system. For example, an antivirus program is used for protecting and treating a computer system from a virus program. In addition, data stored in a hard disk is duplicated in a specific area of the corresponding hard disk or stored in another storage medium, and the data of the hard disk is protected and recovered by replacing with the data stored in advance when a problem occurs.

However, when such an antivirus program is used, data damaged by an unknown virus program is not recovered. In addition, an additional storage space or storage medium corresponding to a size of the duplicated data is required when replacing with the duplicated data, and lots of time is required when using the same.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) US Patent Application Publication No. 2006-0174003.

SUMMARY OF THE INVENTION

Accordingly, the present invention has been made keeping in mind the above problems occurring in the related art, and the present invention is intended to provide a method of controlling backup data by using a snapshot type image table, wherein the method recovers and protects unexpected damaged data by assigning a snapshot table area with a minimum space in a free space of a hard disk, and structurizing and recording in advance an address and a property of data stored in the hard disk.

In addition, another object of the present invention is to provide a method of controlling backup data by using a snapshot type image table, wherein the method enables a user to reconstruct and use data at a desired point of time by sorting backup data by points of time at which data is changed.

In order to achieve the above object, according to one aspect of the present invention, there is provided a method of controlling backup data by using a snapshot type image table, the method including: assigning a snapshot table area, the snapshot table area being formed by a backup program in an encryption key in a free space of a hard disk based on an installation of the backup program for a computer system, and storing therein a plurality of pieces of snapshot information of data not to overlap each other; storing as first snapshot information a data size, a position address, and a time of data of the hard disk in the snapshot table area; when data is added to or removed from the hard disk, storing as second snapshot information a data size designated from a data size of the first snapshot information, a position address, and a time of the added or removed data to be associated with the first snapshot information; respectively displaying and recording unique names, and data sizes and storage times based on the data sizes, the position addresses, and times of the first snapshot information and the second snapshot information, and displaying in a searchable list the unique names of the recorded first snapshot information and the second snapshot information by structurizing the same in a time sequence; and removing a connection to data removed from the second snapshot information of the hard disk by using the data size, the position address, and the time of the first snapshot information, and maintaining a connection to data added to the second snapshot information when a movement request to the first snapshot information is input from a user after respectively displaying and recording the unique names.

According to a method of controlling backup data by using a snapshot type image table of the present invention as described above, unexpected damaged data can be protected and recovered by assigning a snapshot table area with a minimum space in a free space of a hard disk, and structurizing and recording in advance an address and a property of data stored in the hard disk.

In addition, a user can reconstruct and use data at a desired point of time by sorting backup data by points of time at which data is changed.

The above effects according to the present invention are not limited to the above, and it will be clearly understood by those having knowledge in the art that other effects of the present invention can be obtained through the matters described in the below-mentioned examples and claims.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a preferred embodiment of the present invention will be described in detail with reference to the accompanying drawings.

However, the present invention is not limited to the exemplary embodiments set forth below, and may be embodied in various other forms. The present exemplary embodiments are for rendering the description of the present invention complete and are set forth to enable a person with ordinary skill in the technical field to which the present invention pertains to complete understand of the scope of the invention, and the present invention will only be defined by the scope of the claims. Even if not defined, all the terms (including technical or scientific terms) used herein have the same meanings as those generally accepted by typical technologies in the related art to which the present invention pertains. The terms defined in general dictionaries may be construed as having the same meanings as those used in the related art and/or the present disclosure and even when some terms are not clearly defined, they should not be construed as being conceptual or excessively formal.

The present invention relates to a method of controlling backup data by using a snapshot with a minimum space for protecting and recovering data stored in a hard disk 10.

Generally, for a data backup process of a hard disk 10, the hard disk 10 that is managed by an operating system (OS) is used when a user adds or removes data therein. However, for the backup process of data of the hard disk 10, an additional storage space or storage medium corresponding to a size of duplicated data is required when duplicated data is stored and replaced for the same. In addition, lots of time is required when using the same.

In order to solve the above problems, in the present invention, a method of controlling backup data by using a snapshot type image table assigns a snapshot table area 13 with a minimum space in a free space of the hard disk 10 by installing a backup program 20 in which a control algorithm for the hard disk 10 is integrated, and structurizes and records in advance an address and a property of data stored in the hard disk 10 in the snapshot table area 13. By using the above snapshot table area 13, damaged data may be recovered so that the data may be protected.

As described above, in the present invention, a user may reconstruct and use data at a desired point of time by sorting backup data within the snapshot table area 13 by points of time at which data is changed.

Figure 1:
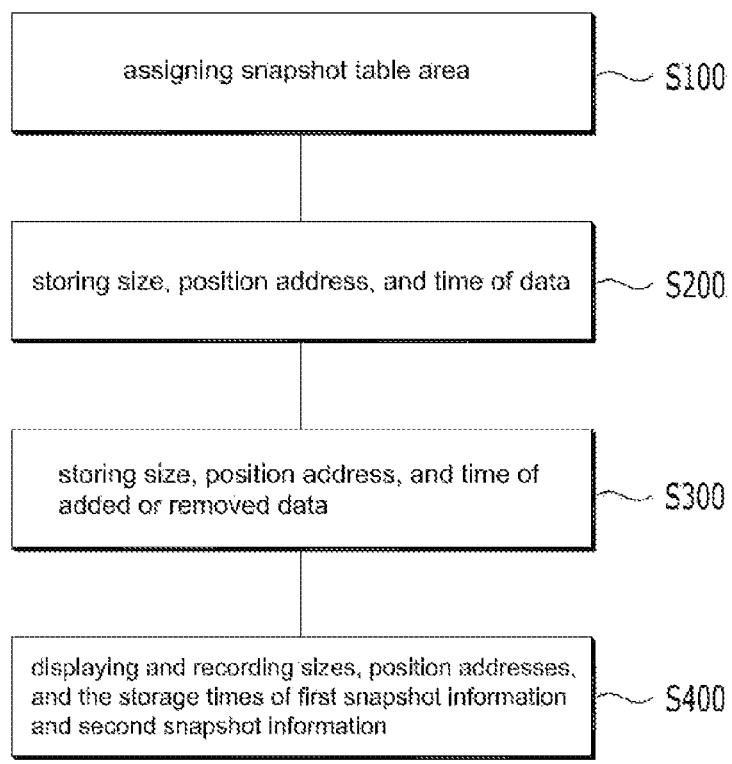
FIG. 1 is a view showing a flowchart showing a method of controlling backup data using a snapshot type image table.

FIG. 1 is a view showing a flowchart of a method of controlling backup data using a snapshot type image table according to a preferred embodiment of the present invention.

Referring to FIG. 1, a method of controlling backup data using a snapshot type image table according to a preferred embodiment of the present invention is performed by a plurality of processes.

In detail, the present invention includes: step S100 of assigning a snapshot table area 13 in which data snapshot information is stored in a free space of a hard disk 10 based on an installation of a backup program 20 for a computer system; step S200 of storing a size, a position address, and a time of data of the hard disk 10 in the snapshot table area 13 as first snapshot information 131; when data is added to or removed from the hard disk 10 in step S200, step S300 of storing a size, a position address, and a time of the added or removed data as second snapshot information 132 to be associated with the first snapshot information 131; and step S400 of displaying and recording the sizes, the position addresses, and the storage times of the first snapshot information 131 and the second snapshot information 132, and displaying the recorded first snapshot information 131 and the second snapshot information 132 in a searchable list by structuralizing the recorded first snapshot information 131 and the second snapshot information 132 in unique names according to a time sequence.

Accordingly, the present invention may protect the data of the hard disk 10 from being lost or changed, and enable recovering thereof when data is lost by using snapshot information stored as backup data.

Figure 2A:
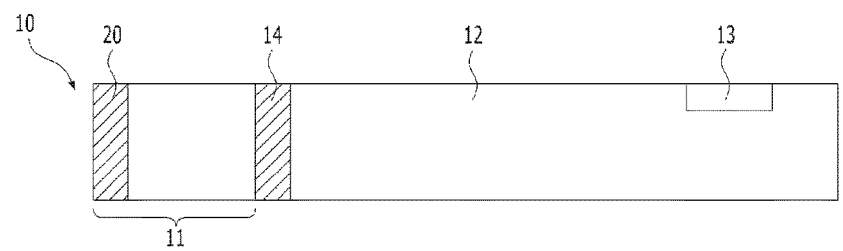
FIG. 2A is a view showing a hard disk to which data is added.
Figure 2B:
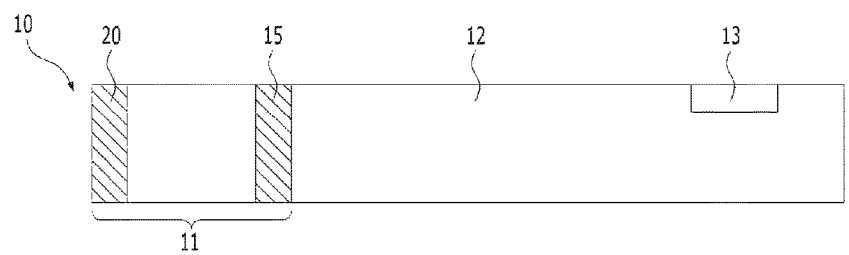
FIG. 2B is a view showing a hard disk from which data is removed.

FIGS. 2A and 2B are view schematically showing the hard disk in which the data of the hard disk is changed according to the method of controlling the backup data using the snapshot type image table of FIG. 1.

FIG. 2A is a view showing the hard disk to which data is added, and FIG. 2B is a view showing the hard disk from which data is removed. Hereinafter, FIGS. 2A and 2B will be described in detail with reference to FIG. 1.

In step S100, based on the installation of the backup program 20 for the computer system, the snapshot table area 13 in which the data snapshot information is stored is assigned in the free space of the hard disk 10.

In detail, within the hard disk 10, a data area 11, a free space area 12, and a snapshot table area 13 are assigned.

The data area 11 is an area in which data for operating the computer system is stored in the hard disk 10.

The hard disk 10 is formed with a storage space with several megabytes to several terabytes, and an operating system, a data file forming program, and a backup program are installed in the above storage space. In other words, an area in which data is stored at the same time with the operating system, the data file forming program, and the backup program 20 becomes the data area 11.

In the present invention, the backup program 20 is included in the data area 11 when the backup program 20 is installed in the hard disk 10. The backup program 20 assigns the snapshot table area 13 for storing data snapshot information of the data of the data area 11 in the free space area 12. The backup program 20 may form the snapshot table area 13 in a space corresponding to a 0.1% size of the entire size of the hard disk 10. The backup program 20 of the present invention may perform steps S100 to S400 or steps of S100 to S500 of the method of controlling backup data using the snapshot type image table of the present invention, or may be operated by the operating system connected to the backup program 20. In addition, it is preferable for the assigned snapshot table area 13 to be protected such that the assigned snapshot table area 13 is not accessed by the operating system (OS) or by the user. Herein, the backup program 20 may form the snapshot table area 13 by using an encryption key.

In the snapshot table area 13, snapshot information generated by the operation of the backup program 20 is stored. Herein, base on a time sequence, when new data is added to an existing data area 11 or data is removed from the data area 11, snapshot information for the same is generated. In the present invention, the snapshot information may be classified into first snapshot information 131, second snapshot information 132, . . . , and nth snapshot information. The snapshot information may be generated in a predetermined interval in a time sequence, or may be generated and classified whenever new data is added to predetermined data, or existing data is removed from the predetermined data. In other words, a plurality of pieces of the snapshot information is generated according to changes in data during the operation of the computer system.

In other words, it is preferable for the snapshot table area 13 to be formed in a continuous area so that the plurality of pieces of the snapshot information generated by the backup program 20 is stacked. Particularly, the plurality of pieces of the snapshot information is stacked by signally or are electrically connected to each other. However, in the present invention, it is preferable for the plurality of pieces of the snapshot information not to overlap each other. This is because, in other words, in order to make a list or index of the plurality of pieces of the snapshot information by points of time which will be described later, the plurality of pieces of the snapshot information is not staked by overlapping each other. This is because, it is difficult to create in a data change history according to an overlapping application.

Then, in step S200, the first snapshot information 131 of the hard disk 10 is stored in the snapshot table area 13. Herein, the first snapshot information 131 may include a size (for example, data capacity of several megabytes to several terabytes), a position address, and a time of data of the hard disk 10. The position address is a fixed address named to hardware or physical storage device, may be an absolute address or a physical address, and is an address positioned in the hard disk 10 of the present invention. The time is a time during which the first snapshot information 131 is generated, a time of the operating system or the computer system when the first snapshot information 131 is generated may be matched and stored.

In step S300, when data is added to or removed from the hard disk 10 after step S200, a size, a position address, and a time of the data added thereto or removed therefrom is stored in the snapshot table area 13 as the second snapshot information 132. As shown in FIGS. 2A and 2B, when data is added to the hard disk 10, an additional area 14 is generated close to the data area 11. Then, when data is removed from the hard disk 10, a removed area 15 is generated in a partial area of the data area 11.

Figure 3:
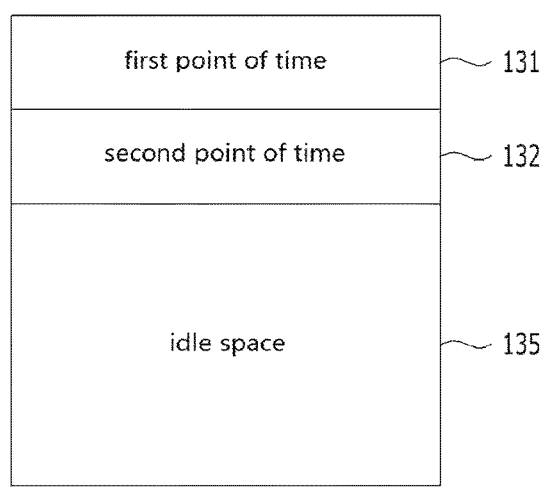
FIG. 3 is a view a snapshot table area of the present invention.

FIG. 3 is a view showing the snapshot table area of the present invention. Referring to FIG. 3 with FIGS. 2A and 2B, as shown in the figures, the hard disk 10 to which the additional area 14 and the removed area 15 are applied changes in a size of the data area 11 thereof, and stores the second snapshot information 132 including a size, a position address, a time of data added thereto or removed therefrom. Herein, the second snapshot information 132 may be stored to be connected to the first snapshot information 131. Then, added snapshot information is continuously stored in an idle space 135. Then, a data size of the second snapshot information 132 may be designated as a data size that is a changed data size of the first snapshot information 131.

In step S400, unique names, sizes and times of the data are respectively displayed and recorded based on the data sizes, position addresses, and times of the first snapshot information 131 and the second snapshot information 132. The unique names of the recorded first snapshot information 131 and the second snapshot information 132 are structurized in a time sequence and displayed in a searchable list.

Figure 4:
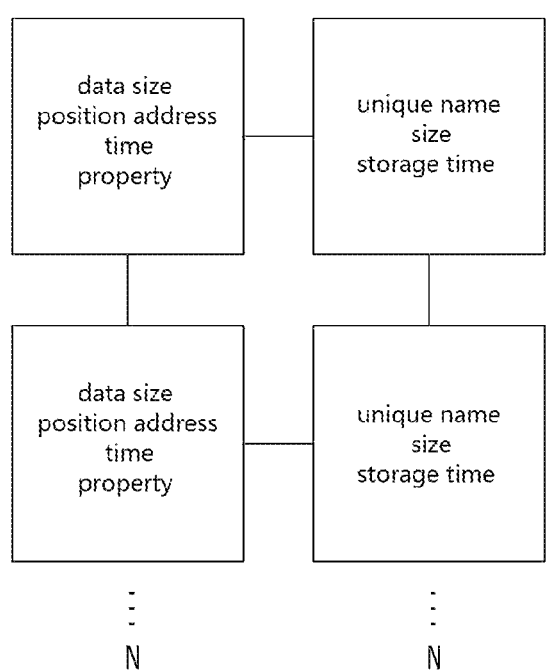
FIG. 4 is a view showing first snapshot information and second snapshot information of the present invention in a list.

FIG. 4 is a view showing the first snapshot information and the second snapshot information of the present invention in a list. Herein, a data size of the second snapshot information 132 is designated as a changed size calculated from the data size of the first snapshot information 131 that is connected to the second snapshot information 132. For example, when a data size of the first snapshot information 131 is 10 gigabytes, and a data size of the second snapshot information 132 is 9 gigabytes, a changed data size is −1 gigabytes. When the data size of the second snapshot information 132 is 11 gigabytes, the changed data size is 1 gigabytes. In the present invention, the changed data size of the second snapshot information 132 may be calculated from the first snapshot information 131 that is connected to the second snapshot information 132 and stacked thereon.

The unique names, the data sizes, and the storage times may be displayed and recorded based on the first snapshot information 131 and the second snapshot information 132. In detail, the unique name may be a generation time of each piece of snapshot information, or a name of a data file. In addition, the size may be a size of the corresponding data. In addition, the storage time may be a time in which each piece of snapshot information is recorded as above. In other words, the unique name is matched based on a plurality of pieces of snapshot information, and structurized in a time sequence and displayed in a searchable list. Herein, it is preferable for the first snapshot information 131 to actually exclude an installation time of the backup program 20. In other words, information generated by the user is recorded in the snapshot table by points of time except for an initial installation time, the user may freely move to a desired point of time by using the recorded information.

In another embodiment of the present invention, after step S400, in step S500 of, by a request of the user to move to the first snapshot information 131, removing a connection to data that is removed from the second snapshot information 132 of the hard disk 10 by using the data size of the first snapshot information 131, the position address, and the time of the first snapshot information 131, and maintaining a connection to data that is added to the second snapshot information 132 may be included.

Figure 5:
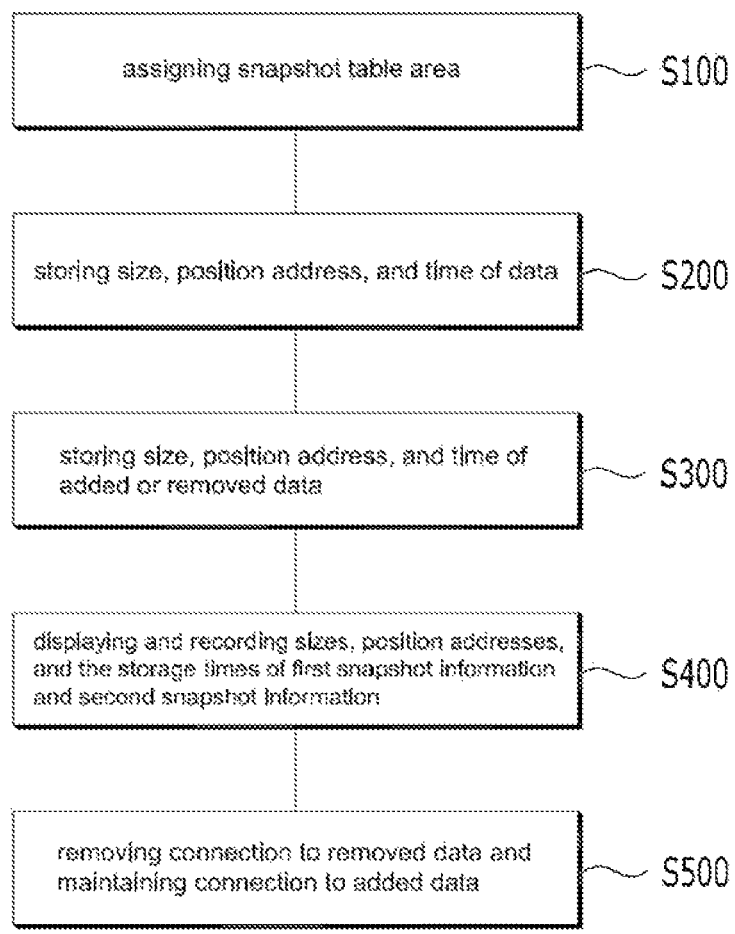
FIG. 5 is a view showing a method of controlling backup data using a snapshot type image table according to another embodiment of the present invention

FIG. 5 is a view showing a flowchart of a method of controlling backup data by using a snapshot type image table according to another embodiment of the present invention. Referring to FIG. 5, in step S500, when a movement request to the first snapshot information 131 is input from the user after step S400, a connection to data that is removed from the second snapshot information 132 of the hard disk 10 is removed by using the data size, the position address, and the time of the first snapshot information 131, and a connection to data added to the second snapshot information 132 is maintained.

As described above, in the present invention, all data changes in the hard disk 10 are recorded in the snapshot table in indexes, and are not removed from the hard disk 10 when a movement or recovering request to a corresponding point of time is input. The corresponding address is cut in a disk index table so that the user may feel that the corresponding data is normally removed.

In detail, among a first point of time, a second point of time, a third time, . . . , and an Nth point of time listed with first snapshot information 131, second snapshot information 132, . . . , and nth snapshot information, when a current point of time is any one of the above points of time and the user inputs a request to move to the first point of time, a new disk index is generated by cutting connection to data that is removed from the disk and connecting to data added to the disk by using snapshot information included in the first point of time, and the computer system is restarted.

Then, a snapshot point may point the point of time designed by the user, and then added or removed data may be managed by using the same method.

According to a method of controlling backup data by using a snapshot type image table of the present invention as described above, in case of unexpected data loss, a data backup process may be stably performed by generating a snapshot of the hard disk 10. In addition, for an increase in a plurality of pieces of snapshot information, a minimum space of the hard disk 10 may be used.

In other words, data of the hard disk 10 is not additionally backed up or duplicated.

In addition, by using a snapshot function, a history backup to a desired point of time or schedule of the user may be performed by using a backup function.

Similar to an index of a map, a status figure of a single system may be generated by scanning a disk. Accordingly, 60,000 pieces of snapshot information different from each other may be generated by using a minimum space of the hard disk 10.

Recovering may be performed by providing an urgent shortcut key even when the operating system of the computer system is not entered.

As described above, a method of controlling backup data using a snapshot type image table according to the present invention has been described in detail with respect to a specific embodiment of the invention. Those skilled in the art and understanding the present disclosure can easily accomplish retrogressive inventions or other embodiments included in the scope of the present disclosure by the addition, modification, and removal of components within the same scope. It is therefore desired that the present embodiments be considered in all respects as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of controlling backup data by using a snapshot type image table, the method comprising:

assigning a snapshot table area, the snapshot table area being formed by a backup program in an encryption key in a free space of a hard disk based on an installation of the backup program for a computer system, and storing therein a plurality of pieces of snapshot information of data not to overlap each other;

storing as first snapshot information a data size, a position address, and a time of data of the hard disk in the snapshot table area;

when data is added to or removed from the hard disk, storing as second snapshot information a data size designated from a data size of the first snapshot information, a position address, and a time of the added or removed data to be associated with the first snapshot information;

respectively displaying and recording unique names, and data sizes and storage times based on the data sizes, the position addresses, and times of the first snapshot information and the second snapshot information, and displaying in a searchable list the unique names of the recorded first snapshot information and the second snapshot information by structurizing the same in a time sequence; and removing a connection to data removed from the second snapshot information of the hard disk by using the data size, the position address, and the time of the first snapshot information, and maintaining a connection to data added to the second snapshot information when a movement request to the first snapshot information is input from a user after respectively displaying and recording the unique names.

\* \* \* \* \*